(12) United States Patent
Bai et al.

(10) Patent No.: US 10,166,991 B1
(45) Date of Patent: Jan. 1, 2019

(54) METHOD AND APPARATUS OF SELECTIVE SENSING MECHANISM IN VEHICULAR CROWD-SENSING SYSTEM

(71) Applicant: GM GLOBAL TECHNOLOGY OPERATIONS LLC, Detroit, MI (US)

(72) Inventors: Fan Bai, Ann Arbor, MI (US); Donald K. Grimm, Utica, MI (US); David E. Bojanowski, Clarkston, MI (US); Omer Tsimhoni, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/828,509

(22) Filed: Dec. 1, 2017

(51) Int. Cl.
| | |
|---|---|
| G08G 1/0965 | (2006.01) |
| B60W 40/02 | (2006.01) |
| G08G 1/16 | (2006.01) |
| G08G 1/0967 | (2006.01) |

(52) U.S. Cl.
CPC ....... B60W 40/02 (2013.01); G08G 1/096775 (2013.01); G08G 1/096791 (2013.01); G08G 1/161 (2013.01); B60W 2550/408 (2013.01)

(58) Field of Classification Search
CPC .... G01S 1/026; G01S 1/028; G01S 2205/006; G01S 2205/008; G01S 5/0009; G01S 5/0018; G01S 5/0054; G01S 5/02; G01S 5/0205; G01S 5/021; G01S 5/0252; G01S 5/0257; G01S 5/0278; G01S 5/06
USPC ....... 340/902, 903, 905, 911, 915, 979, 982, 340/991–994, 995.1, 995.12, 995.19, 340/995.2, 995.23–995.26, 995.28, 427, 340/426.16, 426.2, 426.21
See application file for complete search history.

(56) References Cited

U.S. PATENT DOCUMENTS

| | | | | |
|---|---|---|---|---|
| 9,443,151 | B2 * | 9/2016 | Yoo ..................... | G06K 9/00771 |
| 2013/0345955 | A1 * | 12/2013 | Tashiro .................. | G01C 21/32 701/118 |
| 2015/0146605 | A1 * | 5/2015 | Rubin ...................... | G08G 9/02 370/312 |
| 2015/0220791 | A1 * | 8/2015 | Wu ..................... | G06K 9/00812 348/148 |
| 2016/0025508 | A1 * | 1/2016 | Meyer ................ | G01C 21/3469 701/424 |
| 2016/0057335 | A1 * | 2/2016 | Pisz ................... | H04N 5/23206 348/149 |

(Continued)

Primary Examiner — Daniel Previl
(74) Attorney, Agent, or Firm — Lorenz & Kopf, LLP

(57) ABSTRACT

Systems and method are provided for implementing selective crowd sourcing. In one embodiment, a processor-implemented method for obtaining data from vehicles includes calculating a greedy parameter value for each of a plurality of vehicles in a geographical area; selecting no more than a predetermined number of the plurality of vehicles having a greedy parameter value in a greedy parameter threshold range; instructing the selected vehicles to transmit data while in the geographical area; and receiving the data from the selected vehicles. In another embodiment, a vehicle including a crowd sourcing selection module is provided. The crowd sourcing selection module is configured to retrieve consensus information from a central repository; calculate greedy parameter information regarding the vehicle using the consensus information; and determine whether to transmit an event observation to the central repository based on the greedy parameter information.

20 Claims, 8 Drawing Sheets

(56) References Cited

U.S. PATENT DOCUMENTS

2016/0091609 A1* 3/2016 Ismail ............... G01S 19/49
　　　　　　　　　　　　　　　　　　　702/150
2016/0142876 A1* 5/2016 Klein ............... G01C 21/005
　　　　　　　　　　　　　　　　　　　455/456.2

* cited by examiner

METHOD AND APPARATUS OF SELECTIVE SENSING MECHANISM IN VEHICULAR CROWD-SENSING SYSTEM

TECHNICAL FIELD

The present disclosure generally relates to vehicular crowd sensing systems, and more particularly relates to selective sensing in a crowd sensing system.

BACKGROUND

Modern vehicles are equipped with sensors that can sense environmental conditions. For example, a sensor in a vehicle suspension system may sense when a vehicle passes over a pothole. As vehicles move around, they can be a tremendous source of information regarding the environment in a geographical area and at particular time instances. Modern vehicles are also equipped with controllers with significant computing power and wireless communication interfaces that can be used to communicate sensed environmental conditions to entities outside of the vehicle through communication mechanisms such as Vehicle-to-Vehicle (V2V) or Vehicle-to-Infrastructure (V2I) communications. Advancements in network infrastructure in terms of both coverage and performance combined with advances in cloud computing can allow for transmitting, storing, and processing large amounts of data in an efficient manner.

Accordingly, it is desirable to provide systems and methods for collecting sensor data regarding the environment in a geographical area sensed by multiple vehicles, determining a consensus regarding environmental conditions from the collected data, and sharing the consensus with vehicles in the geographical area. Furthermore, other desirable features and characteristics of the present invention will become apparent from the subsequent detailed description and the appended claims, taken in conjunction with the accompanying drawings and the foregoing technical field and background.

SUMMARY

Systems and method are provided for selective crowd sourcing of environmental condition information in a geographical area. In one embodiment, a processor-implemented method for obtaining data from vehicles in a geographical area is provided. The method includes calculating, by a processor, a greedy parameter value for each of a plurality of vehicles in the geographical area during a first time period; selecting, by the processor, no more than a predetermined number of the plurality of vehicles having a greedy parameter value in a greedy parameter threshold range; instructing, by the processor, the selected vehicles to transmit data while in the geographical area; and receiving the data from the selected vehicles.

In one embodiment, calculating a greedy parameter value includes calculating a contribution-to-cost ratio utility (CCRU) for each of the plurality of vehicles wherein the CCRU is determined based on an error between a ground truth estimation and a consensus observation.

In one embodiment, the CCRU is further determined based on the error between a ground truth estimation and a consensus observation and the union of that error and an observation by one of the plurality of vehicles.

In one embodiment, the CCRU is further determined based on the overall cost of transmitting an observation of a vehicle to a central repository.

In one embodiment, the CCRU for a vehicle k is determined by (a) the difference between: (i) the error between a ground truth estimation and a consensus observation and (ii) the union between the error between a ground truth estimation and a consensus observation and an individual observation by a vehicle; and (b) the transmission cost for transmitting an individual observation to the central repository.

In one embodiment, selecting no more than a predetermined number of the plurality of vehicles having a greedy parameter value in a greedy parameter threshold range includes selecting no more than a predetermined number of the plurality of vehicles having a transmission cost for transmitting an individual observation to the central repository less than a threshold value.

In one embodiment, selecting no more than a predetermined number of the plurality of vehicles having a greedy parameter value in a greedy parameter threshold range includes selecting the predetermined number of the plurality of vehicles with the highest contribution-to-cost ratio utility (CCRU).

In one embodiment, calculating a greedy parameter value includes calculating an error contribution by a vehicle for providing an observation to a central repository.

In one embodiment, calculating a greedy parameter value includes determining a cost estimate for transmitting an observation to a central repository.

In one embodiment, calculating a greedy parameter value includes calculating a contribution-to-cost ratio utility (CCRU) equal to an error contribution by a vehicle divided by a cost estimate for the vehicle to transmit the observation to a central repository.

In another embodiment, a processor-implemented method in a vehicle for determining whether to report data to a central repository is provided. The method includes observing an event; calculating, by a processor in a vehicle, a contribution factor for the event wherein the contribution factor is determined based on the relative difference between the observation of the event and a consensus received from the central repository regarding the event; calculating, by the processor, an effectiveness factor for the observation wherein the effectiveness factor is determined based on the transmission cost for transmitting the observation to the central repository; calculating, by the processor, a reputation score for the vehicle wherein the reputation score is determined based on the accuracy of past observations reported by the vehicle to the central repository; and determining to transmit the observation to the central repository if the contribution factor is above a first threshold level, the effectiveness factor is above a second threshold level, and the reputation score is above a third threshold level.

In one embodiment, the central repository is configured to receive a transmitted observation regarding a driving condition, update a new consensus regarding the driving condition, and publish the new consensus.

In one embodiment, calculating a contribution factor includes calculating an error contribution.

In one embodiment, the error contribution may be determined based on the difference between a consensus observation of the event and an observation of the event by a vehicle.

In one embodiment, calculating an effectiveness factor may include dividing an error contribution by a cost factor.

In another embodiment, a vehicle including a crowd sourcing selection module is provided. The crowd sourcing selection module includes one or more processors configured by programming instructions encoded in non-transient computer readable media. The crowd sourcing module is configured to retrieve consensus information from a central repository; calculate greedy parameter information regarding the vehicle using the consensus information; and determine whether to transmit an event observation to the central repository based on the greedy parameter information.

In one embodiment, the crowd sourcing module is configured to calculate greedy parameter information by calculating a contribution factor for the event observation; calculating an effectiveness factor for the event observation; and calculating a reputation score for the vehicle.

In one embodiment, the contribution factor is determined based on the relative difference between the event observation and a consensus regarding the event.

In one embodiment, the effectiveness factor is determined based on the transmission cost for transmitting the observation to the central repository.

In one embodiment, the crowd sourcing module is configured to determine to transmit an event observation to the central repository when a contribution factor for the event observation exceeds a first threshold level; an effectiveness factor for the event observation exceeds a second threshold level; and a reputation score for the vehicle exceeds a third threshold level.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
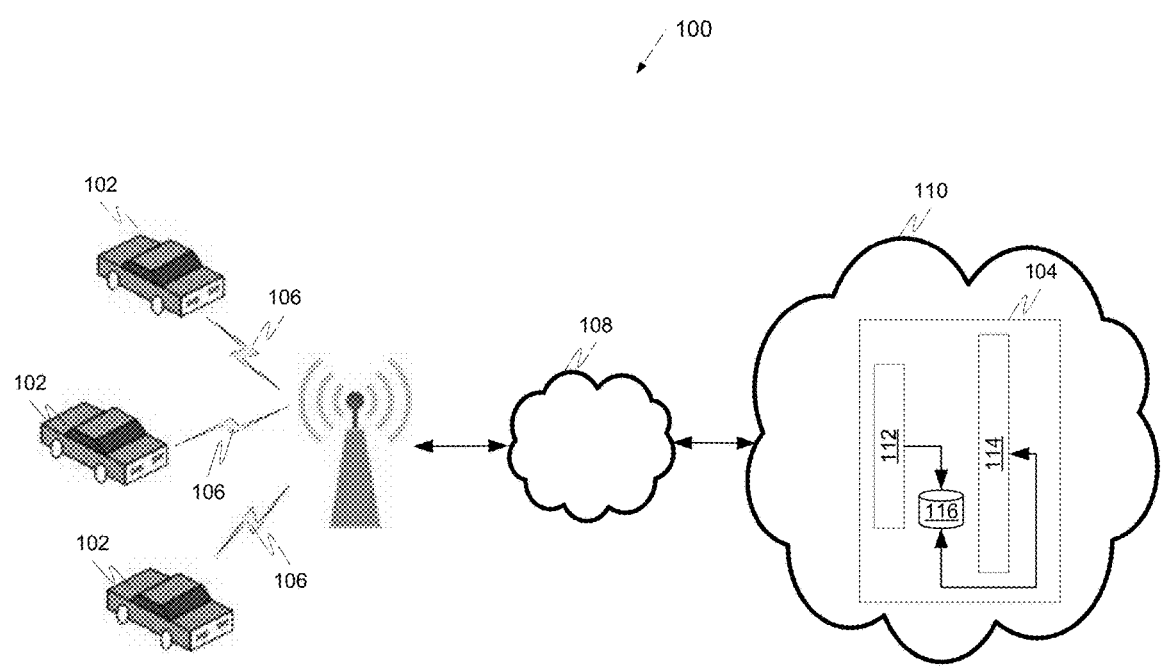
FIG. 1 is a block diagram depicting an example crowd sourcing system in which crowd sourcing is utilized to detect driving condition information, in accordance with various embodiments.

FIG. 1 is a block diagram depicting an example crowd sourcing system 100 in which crowd sourcing is utilized to detect driving condition information. The example system 100 includes a plurality of vehicles 102 that may detect driving condition information via sensors contained within the vehicles and report the detected driving condition information to a cloud-based server 104. The cloud-based server 104 collects the driving condition information from the multiple vehicles 102, stores the information, forms a consensus regarding driving conditions based on the received driving condition information, and shares the consensus with the vehicles 102. The driving condition information may include various types of data such as information regarding road construction, potholes, or others.

The vehicles 102 may communicate with the cloud-based server 104 via a cellular communication channel 106 over a cellular network such as 4G LTE or 4G LTE-V2X, a public network 108, and a private network 110. The example cloud-based server 104 includes an event ingestion module 112 for receiving and storing driving condition information and a consensus generation module 114 for building a consensus regarding driving conditions based on the received driving condition information. The consensus generation module 114 may for example determine that a driving condition event, such as a detected pothole, occurs at a specific location based on the locations of the pothole event reported by multiple vehicles 102. The reported locations may vary, for example, due to the positioning accuracy of the vehicles 102 and the consensus generation module 114 can build a consensus regarding the location of the reported event. The example cloud-based server 104 further includes a data store 116 for storing driving condition event information and driving condition consensus information.

Figure 2:
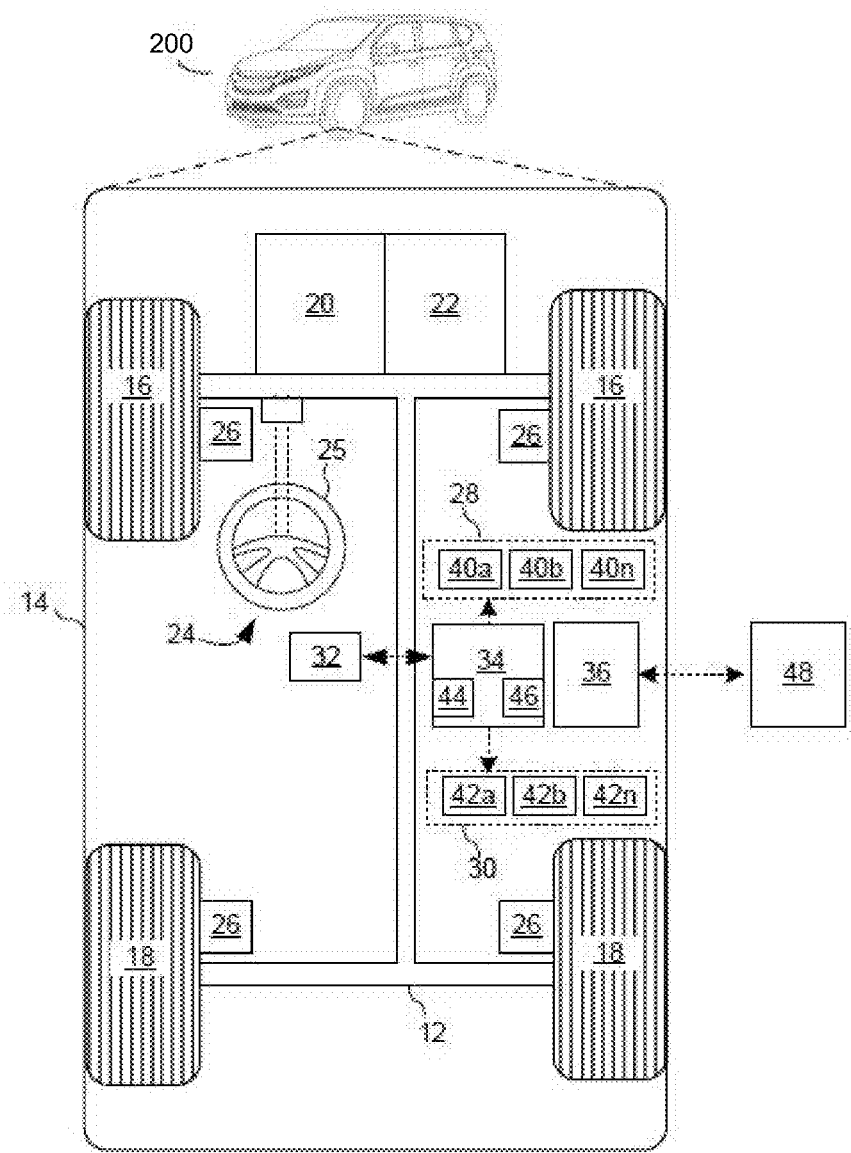
FIG. 2 is a block diagram of an example vehicle that may participate in a crowd sourcing system, in accordance with various embodiments.

FIG. 2 is a block diagram of an example vehicle 200 that may be utilized in a crowd sourcing system to detect driving condition information. The example vehicle 200 generally includes a chassis 12, a body 14, front wheels 16, and rear wheels 18. The body 14 is arranged on the chassis 12 and substantially encloses components of the vehicle 200. The body 14 and the chassis 12 may jointly form a frame. The wheels 16-18 are each rotationally coupled to the chassis 12 near a respective corner of the body 14.

The example vehicle 200 may be an autonomous vehicle (e.g., a vehicle that is automatically controlled to carry passengers from one location to another), a semi-autonomous vehicle or a passenger-driven vehicle. The example vehicle 200 is depicted as a passenger car but may also be another vehicle type such as a motorcycle, truck, sport utility vehicle (SUV), recreational vehicles (RV), marine vessel, aircraft, etc.

The example vehicle 200 includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 200 (such as the state of one or more occupants) and generate sensor data relating thereto. Sensing devices 40a-40n might include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The actuator system 30 includes one or more actuator devices 42a-42n that control one or more vehicle features such as, but not limited to, the propulsion system 20, the transmission system 22, the steering system 24, and the brake system 26. In various embodiments, vehicle 200 may also include interior and/or exterior vehicle features not illustrated in FIG. 2, such as various doors, a trunk, and cabin features such as air, music, lighting, touch-screen display components (such as those used in connection with navigation systems), and the like.

The data storage device 32 stores data for use in the vehicle 200. In various embodiments, the data storage device 32 stores defined maps of the navigable environment. In various embodiments, the defined maps may be pre-defined by and obtained from a remote system. For example, the defined maps may be assembled by the remote system and communicated to the vehicle 200 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 200. In various embodiments, controller 34 is configured to implement a crowd sourcing selection module as discussed in detail below.

The instructions may include one or more separate programs, each of which comprises an ordered listing of executable instructions for implementing logical functions. The instructions, when executed by the processor 44, receive and process signals (e.g., sensor data) from the sensor system 28, perform logic, calculations, methods and/or algorithms for controlling the components of the vehicle 200, and generate control signals that are transmitted to the actuator system 30 to automatically control the components of the vehicle 200 based on the logic, calculations, methods, and/or algorithms. Although only one controller 34 is shown in FIG. 2, embodiments of the vehicle 200 may include any number of controllers 34 that communicate over a suitable communication medium or a combination of communication mediums and that cooperate to process the sensor signals, perform logic, calculations, methods, and/or algorithms, and generate control signals to automatically control features of the vehicle 200.

The communication system 36 is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The vehicle 200 may also include a perception system and a positioning system. The perception system synthesizes and processes the acquired sensor data and predicts the presence, location, classification, and/or path of objects and features of the environment of the vehicle 200. In various embodiments, the perception system can incorporate information from multiple sensors (e.g., sensor system 28), including but not limited to cameras, lidars, radars, and/or any number of other types of sensors.

The positioning system processes sensor data along with other data to determine a position (e.g., a local position relative to a map, an exact position relative to a lane of a road, a vehicle heading, etc.) of the vehicle 200 relative to the environment. As can be appreciated, a variety of techniques may be employed to accomplish this localization, including, for example, simultaneous localization and mapping (SLAM), particle filters, Kalman filters, Bayesian filters, and the like.

In various embodiments, the controller 34 implements machine learning techniques to assist the functionality of the controller 34, such as feature detection/classification, obstruction mitigation, route traversal, mapping, sensor integration, ground-truth determination, and the like.

Figure 3:
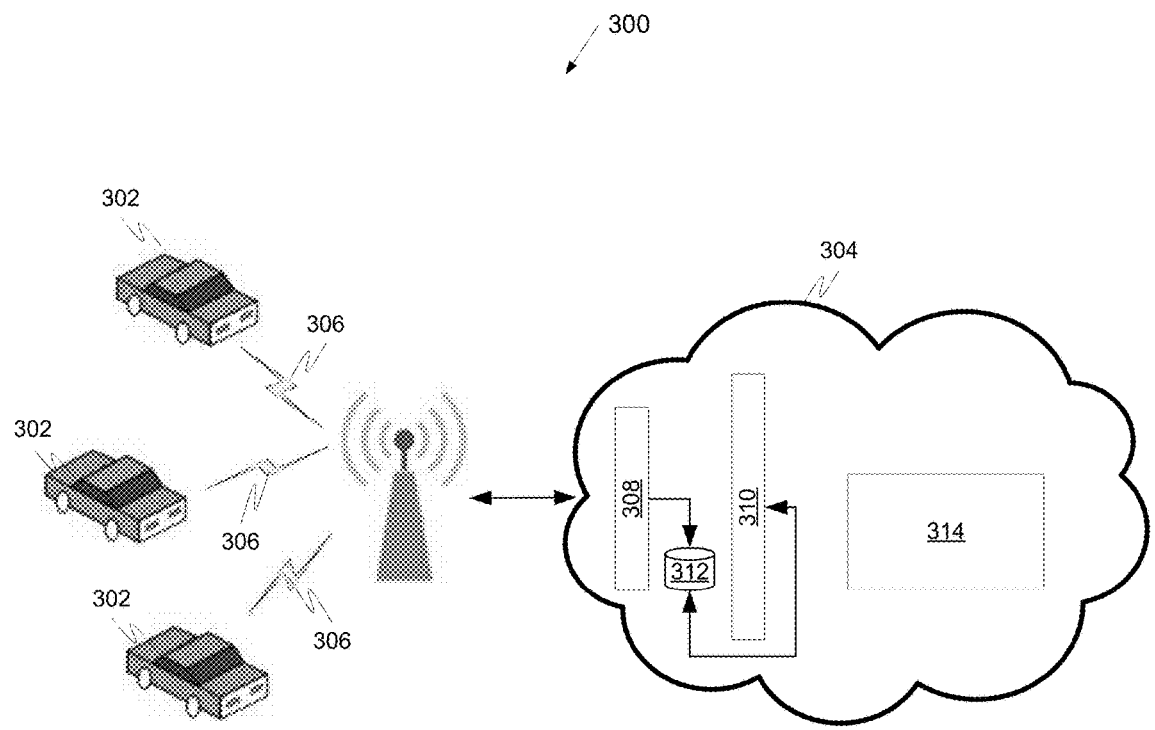
FIG. 3 is a block diagram depicting example components of a crowd sourcing system, in accordance with various embodiments.

FIG. 3 is a block diagram depicting example components of another crowd sourcing system 300. The example system includes a plurality of vehicle 302 that are configured to detect driving condition information and report the detected driving condition information to a cloud-based server 304. The cloud-based server 304 is configured to collect the driving condition information from multiple vehicles 302, store the information, form a consensus regarding driving conditions based on the received driving condition information, and share the consensus with the vehicles 302. The driving condition information may include various types of data such as information regarding road construction, potholes, or others.

The vehicles 302 may communicate with the cloud-based server 304 via a cellular communication channel 306 over a cellular network such as 4G LTE or 4G LTE-V2X. The example cloud-based server 304 includes an event ingestion module 308 for receiving and storing driving condition information, a consensus generation module 310 for building a consensus regarding driving conditions based on the received driving condition information, and a data store 312 for storing driving condition event information and driving condition consensus information.

The example crowd sourcing system 300 takes a top-down approach to selecting vehicles to report event information and further includes a crowd sourcing selection module in the example cloud-based server 304 for selecting a subset of the available vehicles 302 to report driving condition event information during a specific time period in a specific geographical area. The example crowd sourcing system 300 is configured to minimize the cost associated with implementing a crowd-sensing system without degrading event detection performance. The example crowd sourcing system 300 can leverage the system's implicit temporal/spatial redundancy by allowing some but not all of the available vehicles to report event information. The example crowd sourcing system 300 is configured to use realistic heuristic, suboptimal solutions that are feasible for a real-world deployment. The example crowd sourcing system 300 is configured to achieve tradeoff between cost-effectiveness and system performance. The example crowd sourcing system 300 is configured to provide a method of using greedy algorithm metric that takes both system performance and system cost into consideration. The example crowd sourcing system 300 utilizes a greedy algorithm that chooses a subset of vehicle nodes to minimize sensing estimation errors.

The example cloud-based server 304 includes a crowd sourcing selection module 314 that is configured to select a subset of available vehicles 302 to optimize the cost structure of the crowd-sensing system 302 without degrading the event detection accuracy and latency. The example crowd sourcing selection module 314 employs a greedy, distributed algorithm for choosing a proper set of vehicle nodes to achieve minimized sensing estimation error between the physical phenomenon and individual observations.

Figure 4:
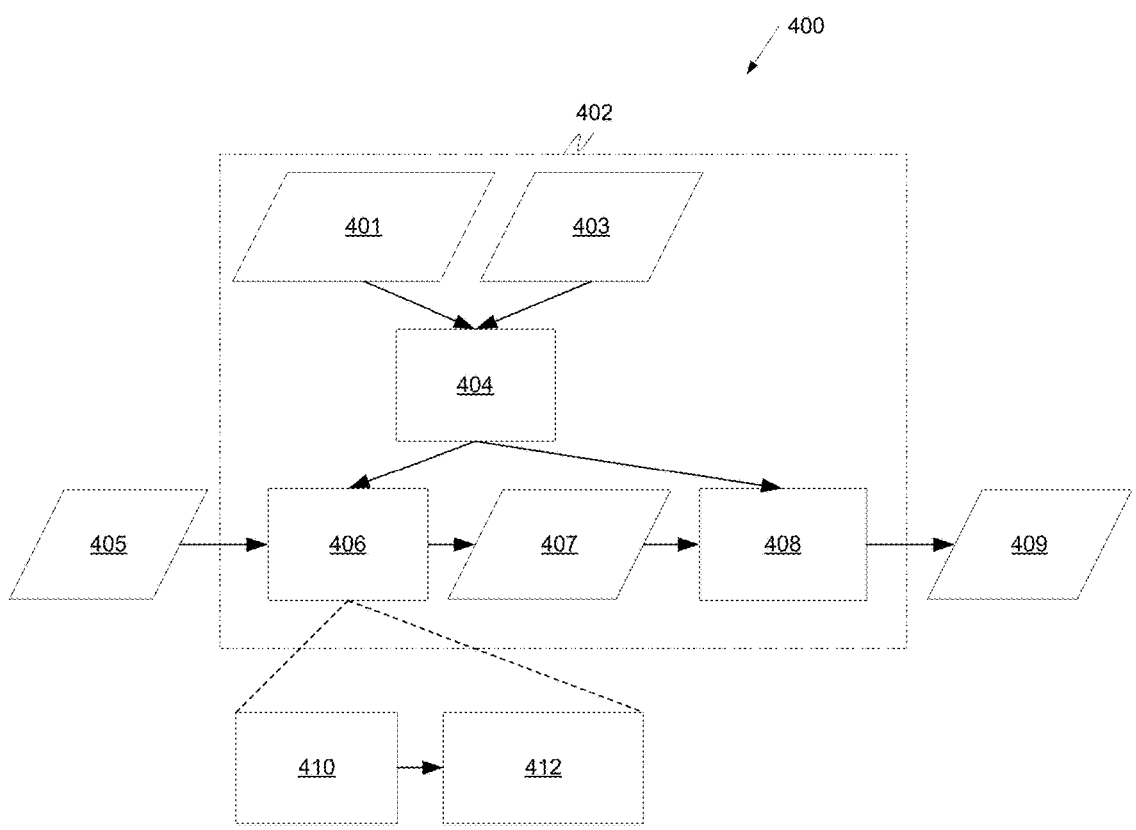
FIG. 4 is a block diagram depicting example components of a crowd sourcing selection module in an example cloud-based server, in accordance with various embodiments.

FIG. 4 is a block diagram depicting example components of a crowd sourcing selection module 402 in an example cloud-based server 400. The example crowd sourcing selection module 402 includes an objective module 404, a feasibility module 406, and a solution module 408.

The example objective module 404 receives and/or calculates the maximum number of vehicles to use 401 in a particular time period in a particular geographical area to report event information to the cloud-based server 400. The example objective module 404 also receives and/or calculates an acceptable greedy parameter value to use 401 during the particular time period in the particular geographical area.

The example feasibility module 406 is configured to retrieve information regarding the vehicles 405 in the particular geographical area during the particular time period and acceptable greedy parameter value information from the objective module and determines a candidate set of vehicles 407 from which the cloud-based server 400 can select a subset of available vehicles to optimize the cost structure of the crowd-sensing system without degrading the event detection accuracy and latency. Vehicle information could include such data as usage information, e.g., time-of-day, trip durations, travel diversity, etc. The example feasibility module 406 employs a greedy parameter calculation module 410 for calculating a greedy parameter value for each of the vehicles 405 considered by the feasibility module 406. The example feasibility module 406 also employs a greedy parameter range determination module 412 for determining if the calculated greedy parameter value for a vehicle 405 is acceptable for selecting the vehicle 405 for inclusion in the candidate set 407

The example solution module 408 is configured to retrieve the candidate set 407 of vehicles and select a number of vehicles from the candidate set, not greater than the max number of vehicles to use specified by the objective module 404, for inclusion in a solution set of vehicles. The solution module 408 may select the solution set 409 using many different techniques. In one example, the solution module 408 may select the vehicles in the candidate set with the highest greedy parameter value if a higher greedy parameter value is preferred over a lower greedy parameter value. In another example, the solution module 408 may select the vehicles with the lowest greedy parameter value if a lower greedy parameter value is preferred over a higher greedy parameter value. In another example, the solution module 408 may select the vehicles up to the max number of vehicles to use in the candidate set based chronologically on their inclusion in the candidate set. Other selection methods may also be employed.

After the crowd sourcing selection module 402 selects the vehicles to report event information to the cloud-based server 400, the cloud-based server 400 may inform the selected vehicles to report event information and/or inform the non-selected vehicles not to report event information. This may allow the cloud-based server 400 to optimize the cost structure of the crowd-sensing system without degrading the event detection accuracy and latency.

Calculating a greedy parameter value for a vehicle may include calculating a contribution-to-cost ratio utility (CCRU) for the vehicle. The CCRU may be determined based on the error between a ground truth estimation and a consensus observation. The CCRU may further be determined based on the error between a ground truth estimation and the union of an individual observation by the vehicle and the consensus observation. The CCRU may be further determined based on the overall cost of transmitting an individual observation to the central repository or cloud-based server. In one example, the CCRU for a vehicle k is determined by
$CCRU_k(t)=$
where $\|P(x,y,t)-O(x,y,t)\|$ is the error between a ground truth estimation $P(x,y,t)$ and a consensus observation $O(x,y,t)$; $\|P(x,y,t)-f(O(x,y,t)\cup O_k(x,y,t))\|$ is the union between the error between a ground truth estimation $P(x,y,t)$ and consensus observation $f(O(x,y,t)$ and a vehicle's observation $O_k(x,y,t)$; and $C_k(t)$ is the transmission cost for transmitting an individual observation to the central repository or cloud-based server.

Figure 5:
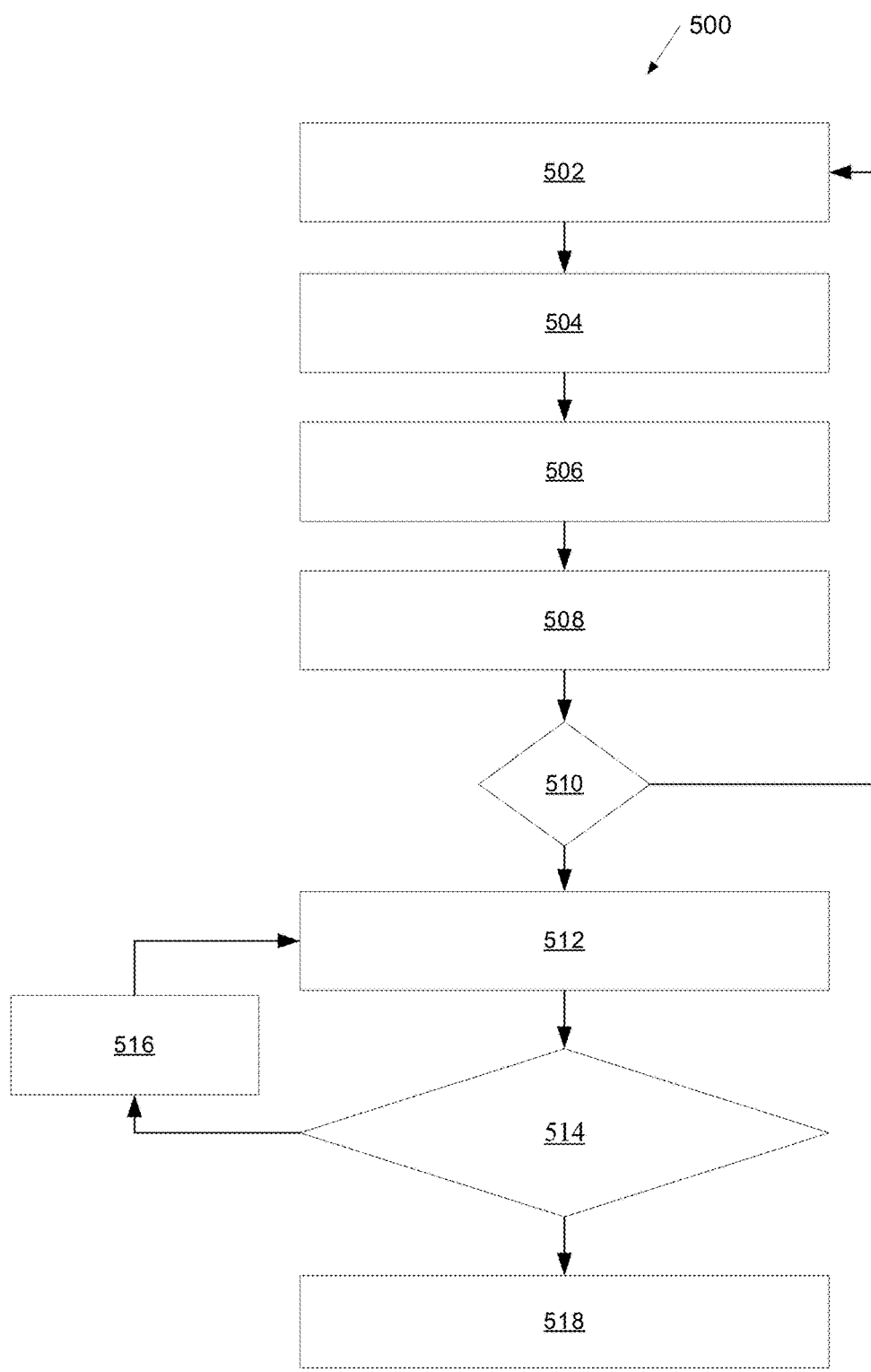
FIG. 5 is a process flow chart depicting an example process in a cloud-based system for selecting vehicles to contribute event information to a crowd-sourcing system, in accordance with various embodiments.

FIG. 5 is a process flow chart depicting an example process 500 in a cloud-based system for selecting vehicles to contribute event information to a crowd-sourcing system. The order of operation within the example process 500 is not limited to the sequential execution as illustrated in the figure, but may be performed in one or more varying orders as applicable and in accordance with the present disclosure.

The example process 500 includes selecting, by a processor in a cloud-based system, a vehicle k in a geographical region R during a time slot t (operation 502). The example process 500 further includes determining by the processor the error contribution $\varepsilon_k(t)$ to the consensus by the vehicle k when it provides an event observation (operation 504). As an example, the error contribution $\varepsilon_k(t)$ may be determined by $\|P(x,y,t)-O(x,y,t)\|-\|P(x,y,t)-f(O(x,y,t)\cup O_k(x,y,t))\|$ where $\|P(x,y,t)-O(x,y,t)\|$ is the error between a ground truth estimation $P(x,y,t)$ and a consensus observation $O(x,y,t)$ and $\|P(x,y,t)-f(O(x,y,t)\cup O_k(x,y,t))\|$ is the union between the error between a ground truth estimation $P(x,y,t)$ and a consensus observation $f(O(x,y,t)$ and an individual observation by the vehicle $O_k(x,y,t)$.

The example process 500 further includes determining by the processor a cost estimation $C_k(t)$ for the vehicle k to transmit or provide an event observation to the cloud-based server (operation 506) and estimating a contribution-to-cost ratio utility $CCRU_k(t)$ for the vehicle k to transmit or provide an event observation to the cloud-based server (operation 508). As an example, the $CCRU_k(t)$ may be determined by dividing the error contribution $\varepsilon_k(t)$ by the cost estimation $C_k(t)$.

The operations of selecting a vehicle k, determining an error contribution $\varepsilon_k(t)$ by the vehicle k, determining a cost estimation $C_k(t)$ for the vehicle k, and estimating a contribution-to-cost ratio utility $CCRU_k(t)$ for the vehicle k may be repeated for all vehicles in the geographical region R during the time slot t or for a subset of the vehicles in the geographical region R during the time slot t. The example process 500 includes determining whether there are additional vehicles for which selecting a vehicle k, determining an error contribution $\varepsilon_k(t)$ by the vehicle k, determining a cost estimation $C_k(t)$ for the vehicle k, and estimating a contribution-to-cost ration utility $CCRU_k(t)$ for the vehicle k should be performed (decision 510). If additional vehicles are to be processed (yes at decision 510), then the example process 500 proceeds to selecting, by a processor in a cloud-based system, a vehicle k in a geographical region R during a time slot (operation 502).

If no additional vehicles are to be processed (no at decision 510), then the example process 500 proceeds to selecting vehicles based on their contribution-to-cost ratio utility $CCRU_k(t)$ (operation 512). In this example, a maximum of m vehicles is selected and the m vehicles with the largest contribution-to-cost ratio utility $CCRU_k(t)$ are selected.

The cost estimation $C_k(t)$ of the selected vehicles are evaluated (decision 514). If the cost estimation $C_k(t)$ for each selected vehicle is not lower than a maximum allowable cost $C_{MAX}(t)$ (no at decision 514), then the selected vehicles for which the cost estimation $C_k(t)$ is not lower than a maximum allowable cost $C_{MAX}(t)$ are disregarded (operation 516) and replacement vehicles are selected (operation 512). If the cost estimation $C_k(t)$ for each selected vehicle is lower than a maximum allowable cost $C_{MAX}(t)$ (yes at decision 514), then the cloud-based system may instruct the selected vehicles to contribute observations during time slot t while in geographical region r (operation 518) and/or instruct the non-selected vehicles not to contribute observations during time slot t while in geographical region r.

Figure 6:
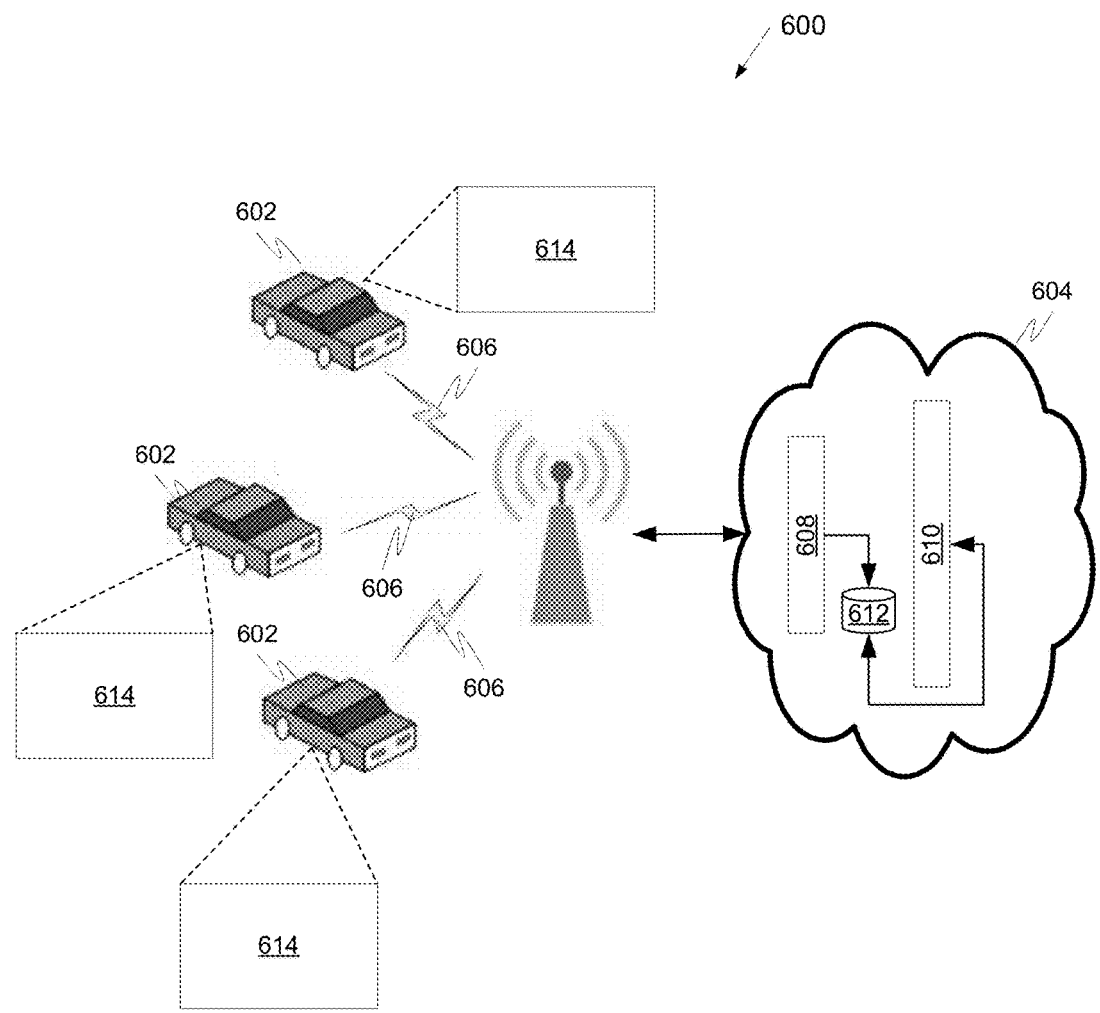
FIG. 6 is a block diagram depicting example components of another crowd sourcing system, in accordance with various embodiments.

FIG. 6 is a block diagram depicting example components of another crowd sourcing system 600. The example system includes a plurality of vehicle 602 that are configured to detect driving condition information and report the detected driving condition information to a cloud-based server 604. The cloud-based server 604 is configured to collect the driving condition information from multiple vehicles 602, store the information, form a consensus regarding driving conditions based on the received driving condition information, and share the consensus with the vehicles 602. The driving condition information may include various types of data such as information regarding road construction, potholes, or others.

The vehicles 602 may communicate with the cloud-based server 604 via a cellular communication channel 606 over a cellular network such as 4G LTE or 4G LTE-V2X. The example cloud-based server 604 includes an event ingestion module 608 for receiving and storing driving condition information, a consensus generation module 610 for building a consensus regarding driving conditions based on the received driving condition information, and a data store 612 for storing driving condition event information and driving condition consensus information.

The example crowd sourcing system 600 takes a bottoms-up approach to selecting vehicles to report event information and further includes a crowd sourcing selection module 614 in the example vehicles 602 for selecting which of the available vehicles 602 to report driving condition event information during a specific time period in a specific geographical area. The example crowd sourcing system 600 is configured to minimize the cost associated with implementing a crowd-sensing system without degrading event detection performance. The example crowd sourcing system 600 can leverage the system's implicit temporal/spatial redundancy by allowing some but not all of the available vehicles to report event information. The example crowd sourcing system 600 is configured to use realistic heuristic, suboptimal solutions that are feasible for a real-world deployment. The example crowd sourcing system 600 is configured to achieve tradeoff between cost-effectiveness and system performance. The example crowd sourcing system 600 is configured to provide a method of using greedy algorithm metric that takes both system performance and system cost into consideration. The example crowd sourcing system 600 utilizes a greedy algorithm that chooses a subset of vehicle nodes to minimize sensing estimation error.

The example crowd sourcing selection modules 614 are configured to allow a subset of available vehicles 602 to transmit event information to optimize the cost structure of the crowd-sensing system 600 without degrading the event detection accuracy and latency. The example crowd sourcing selection modules 614 employ a greedy algorithm for choosing a proper set of vehicle nodes that get minimized sensing estimation error between the physical phenomenon and individual observations.

Figure 7:
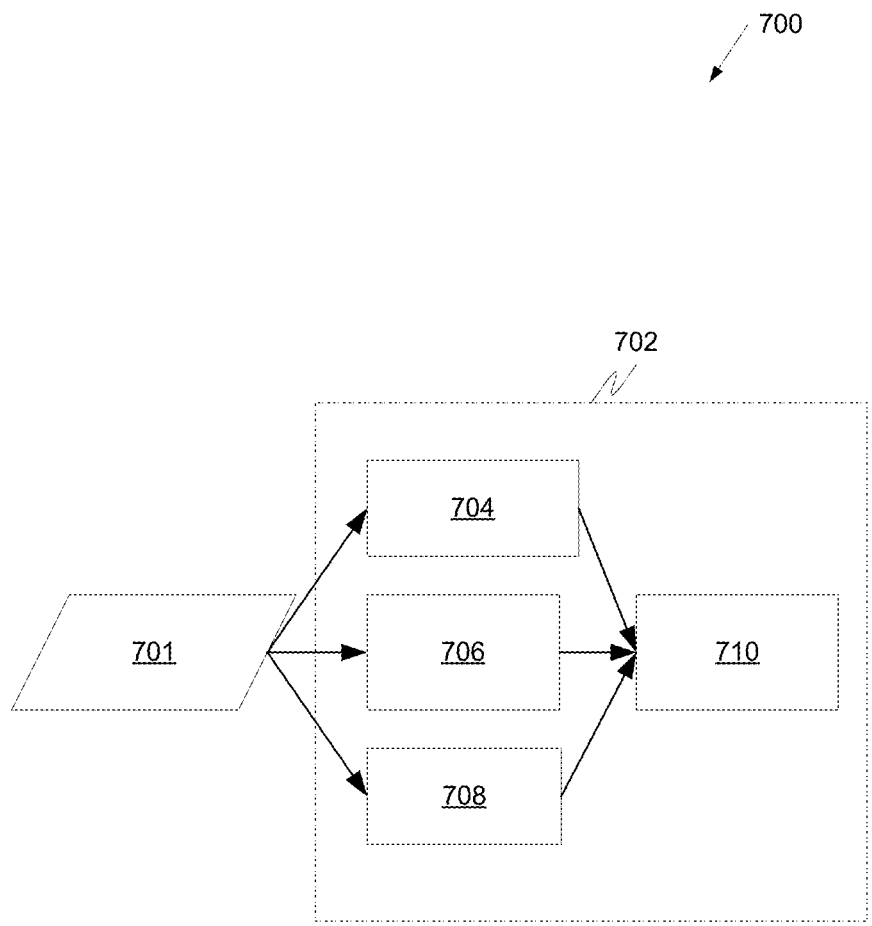
FIG. 7 is a block diagram depicting example components of a crowd sourcing selection module in an example vehicle, in accordance with various embodiments.

FIG. 7 is a block diagram depicting example components of a crowd sourcing selection module 702 in an example vehicle 700. The example crowd sourcing selection module 702 includes a contribution module 704, an effectiveness module 706, a qualification module 708, and a decision module 710. The example crowd sourcing selection module 702 retrieves consensus information 701 from a cloud-based server calculates greedy parameter information regarding the vehicle using the consensus information and determines based on the vehicle's greedy parameter information whether it should transmit event information to the cloud-based server.

The example contribution module 704 is configured to calculate a contribution factor for the observation of the driving condition. The example contribution factor is determined based on the relative difference between the observation of the driving condition and a consensus received from the central repository or cloud-based server regarding the driving condition.

The example effectiveness module 706 is configured to calculate an effectiveness factor for the observation. The example effectiveness factor is determined based on the relative difference between the consensus observation of an event and an individual observation of the event and based on the transmission cost for transmitting the observation to the central repository or cloud-based server.

The example qualification module 708 is configured to calculate a reputation score for the vehicle. The example reputation score is determined based on the accuracy of past observations reported by the vehicle to the central repository or cloud-based server.

The example decision module 710 is configured to determine whether or not the vehicle should transmit event information to the cloud-based server. In this example, the example decision module 710 determines that the vehicle should transmit event information if three conditions exists. The first condition is that the contribution factor is above a first threshold level (e.g., $\|O'(x,y,t-1) - O_k(x,y,t)\| > \gamma$, where $\|O'(x,y,t-1) - O_k(x,y,t)\|$) is the contribution factor, $O'(x,y,t-1)$ is a consensus observation, $O_k(x,y,t)$ is an observation by the vehicle, and $\gamma$ represents the first threshold level) or if a consensus observation (e.g., $O'(x,y,t-1)$) does not exist. The second condition is that the effectiveness factor is above a second threshold level (e.g., $$\frac{\|O'(x, y, t-1) - O_k(x, y, t)\|}{C_k(t)} > \beta(t),$$

where $\|O'(x,y,t-1) - O_k(x,y,t)\|$ is the contribution factor, $C_k(t)$) is a cost factor, and $\beta(t)$ represents the second threshold level). The third condition is that the reputation score ($R_k$) is above a third threshold level ($\delta(0)$).

The use of the crowd sourcing selection module 702 in the example vehicles may allow for optimizing the cost structure of the crowd-sensing system without degrading the event detection accuracy and latency.

Figure 8:
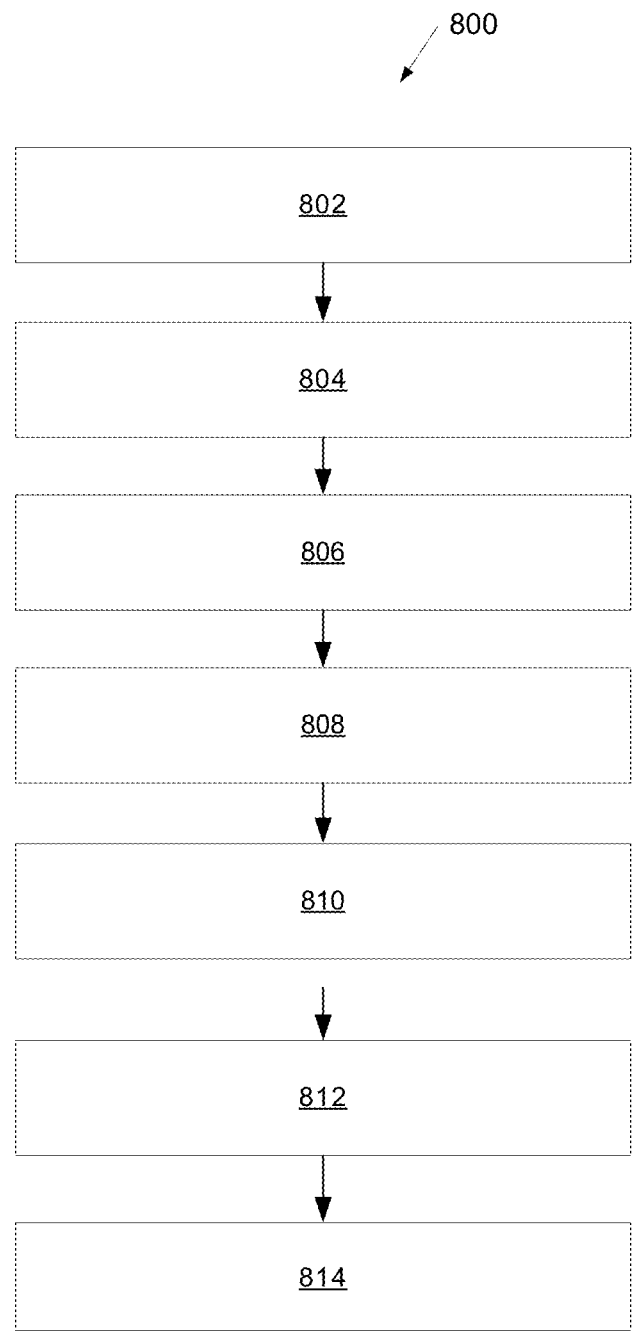
FIG. 8 is a process flow chart depicting an example process in a vehicle for determining whether the vehicles should contribute event information to a crowd-sourcing system, in accordance with various embodiments.

FIG. 8 is a process flow chart depicting an example process 800 in a vehicle for determining whether the vehicle should contribute observed event information to a crowd-sourcing system. The order of operation within the example process 800 is not limited to the sequential execution as illustrated in the figure, but may be performed in one or more varying orders as applicable and in accordance with the present disclosure.

The example process 800 includes determining, by a processor in a vehicle k in a geographical region R during a time slot, an error contribution $\varepsilon_k(t)$ by the vehicle k regarding an event observation (operation 802). As an example, the error contribution $\varepsilon_k(t)$ criteria may be determined by $\|O'(x,y,t-1) - O_k(x,y,t)\|$ where $\|O'(x,y,t-1)\|$ is a consensus observation and $O_k(x,y,t)$ is the vehicle's observation. The example process 800 further includes estimating a contribution-to-cost ratio utility $CCRU_k(t)$ for the vehicle k to transmit or provide an event observation to a cloud-based server (operation 804). As an example, the $CCRU_k(t)$ may be determined by dividing the error contribution $\varepsilon_k(t)$ by a cost estimation $C_k(t)$. The example process 800 further includes evaluating the reputation score $R_k$ of the vehicle k in providing accurate event observation information (operation 806).

The example process 800 further includes determining if the error contribution $\varepsilon_k(t)$ is greater than a first threshold level $\gamma$, the contribution-to-cost ratio utility $CCRU_k(t)$ is greater than a second threshold level $\beta(t)$, and the reputation score $R_k$ is greater than a third threshold level $\delta(t)$ (operation 808). If the error contribution $\varepsilon_k(t)$ is greater than a first threshold level $\gamma$, the contribution-to-cost ratio utility $CCRU_k(t)$ is greater than a second threshold level $\beta(t)$, and the reputation score $R_k$ is greater than a third threshold level $\delta(t)$, then the vehicle may upload an event observation (operation 810).

The example process 800 further includes operations in a cloud-based server after receipt of an uploaded event observation. The example process 800 includes the cloud-based server updating the consensus regarding the event (operation 812) and the cloud-based server updating and publishing new second threshold level $\beta(t)$ and third threshold level $\delta(t)$ (operation 814).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A processor-implemented method for obtaining data from vehicles in a geographical area, the method comprising:
    calculating, by a processor using a greedy algorithm, a greedy parameter value for each of a plurality of vehicles in the geographical area during a first time period, wherein the greedy parameter values calculated for the plurality of vehicles are configured for use as a selection metric useful for determining which of a subset of the plurality of vehicles to select to report event information observed by the vehicle;
    selecting, by the processor, less than all and no more than a predetermined number of the plurality of vehicles having a greedy parameter value in a greedy parameter threshold range;
    instructing, by the processor, only the selected vehicles to transmit observed event information while in the geographical area; and
    receiving the observed event information from the selected vehicles and not receiving observed event information from the non-selected vehicles.

2. The method of claim 1, wherein calculating a greedy parameter value comprises calculating a contribution-to-cost ratio utility (CCRU) for each of the plurality of vehicles, the CCRU determined based on an error between a ground truth estimation and a consensus observation.

3. The method of claim 2, wherein the CCRU is further determined based on the error between a ground truth estimation and a consensus observation and the union of that error and an observation by one of the plurality of vehicles.

4. The method of claim 2, wherein the CCRU is further determined based on the overall cost of transmitting an observation of a vehicle to a central repository.

5. The method of claim 2, wherein the CCRU for a vehicle k is determined by:
    the difference between:
        the error between a ground truth estimation and a consensus observation; and
        the union between the error between a ground truth estimation and a consensus observation and an individual observation by a vehicle; and
    the transmission cost for transmitting an individual observation to the central repository.

6. The method of claim 1, wherein selecting no more than a predetermined number of the plurality of vehicles having a greedy parameter value in a greedy parameter threshold range comprises selecting no more than a predetermined number of the plurality of vehicles having a transmission cost for transmitting an individual observation to the central repository less than a threshold value.

7. The method of claim 1, wherein selecting no more than a predetermined number of the plurality of vehicles having a greedy parameter value in a greedy parameter threshold range comprises selecting the predetermined number of the plurality of vehicles with the highest contribution-to-cost ratio utility (CCRU).

8. The method of claim 1, wherein calculating a greedy parameter value comprises calculating an error contribution by a vehicle for providing an observation to a central repository.

9. The method of claim 8, wherein calculating a greedy parameter value comprises determining a cost estimate for transmitting an observation to a central repository.

10. The method of claim 9, wherein calculating a greedy parameter value comprises calculating a contribution-to-cost ratio utility (CCRU) equal to an error contribution by a vehicle divided by a cost estimate for the vehicle to transmit the observation to a central repository.

11. A processor-implemented method in a vehicle for determining whether to report data to a central repository, the method comprising:
    observing an event;
    calculating greedy parameter information regarding the vehicle, the calculating comprising:
        calculating, by a processor in the vehicle, a contribution factor for the event, the contribution factor determined based on the relative difference between the observation of the event and a consensus received from the central repository regarding the event;
        calculating, by the processor, an effectiveness factor for the observation, the effectiveness factor determined based on the relative difference between the observation of the event and the consensus and based on the transmission cost for transmitting the observation to the central repository; and
        calculating, by the processor, a reputation score for the vehicle, the reputation score determined based on the accuracy of past observations reported by the vehicle to the central repository; and
    determining to transmit the observation to the central repository if the contribution factor is above a first threshold level, the effectiveness factor is above a second threshold level, and the reputation score is above a third threshold level.

12. The method of claim 11, wherein the central repository is configured to receive a transmitted observation regarding a driving condition, update a new consensus regarding the driving condition, and publish the new consensus.

13. The method of claim 11, wherein calculating a contribution factor comprises calculating an error contribution.

14. The method of claim 13, wherein the error contribution may be determined based on the difference between a consensus observation of the event and an observation of the event by a vehicle.

15. The method of claim 11, wherein calculating an effectiveness factor may comprise dividing an error contribution by a cost factor.

16. A vehicle comprising a crowd sourcing selection module, the crowd sourcing selection module comprising one or more processors configured by programming instructions encoded in non-transient computer readable media, the crowd sourcing module configured to:
    retrieve consensus information from a central repository;
    calculate greedy parameter information regarding the vehicle using the consensus information, wherein the greedy parameter information includes one or more of different factors relating to a comparison of an event observation to the consensus information, the transmission cost for transmitting the event observation to the central repository, and the accuracy of past observations reported by the vehicle to the central repository; and
    determine whether to transmit the event observation to the central repository based on the greedy parameter information.

17. The vehicle of claim 16, wherein the crowd sourcing module is configured to calculate greedy parameter information by:
    calculating a contribution factor for the event observation;

calculating an effectiveness factor for the event observation; and calculating a reputation score for the vehicle.

18. The vehicle of claim 17, wherein the contribution factor is determined based on the relative difference between the event observation and a consensus regarding the event.

19. The vehicle of claim 17, wherein the effectiveness factor is determined based on the transmission cost for transmitting the observation to the central repository.

20. The vehicle of claim 16, wherein the crowd sourcing module is configured to determine to transmit an event observation to the central repository when:

a contribution factor for the event observation exceeds a first threshold level;

an effectiveness factor for the event observation exceeds a second threshold level; and a reputation score for the vehicle exceeds a third threshold level.

* * * * *